United States Patent

Harano

[11] Patent Number: 6,091,782
[45] Date of Patent: Jul. 18, 2000

[54] METHOD OF DIVERSITY-RECEIVING REPEATED TRANSMISSIONS USING SYMBOL DECISION THRESHOLD BANDS

[75] Inventor: Nobuya Harano, Kakegawa, Japan

[73] Assignee: NEC Corporation, Tokyo, Japan

[21] Appl. No.: 08/897,646

[22] Filed: Jul. 21, 1997

[30] Foreign Application Priority Data

Jul. 19, 1996 [JP] Japan ................................. 8-190585

[51] Int. Cl.[7] ................................................. H04L 25/34
[52] U.S. Cl. .......................................... 375/287; 375/347
[58] Field of Search .................................. 375/287, 264, 375/286, 316, 347

[56] References Cited

U.S. PATENT DOCUMENTS

| | | | |
|---|---|---|---|
| 4,339,823 | 7/1982 | Predina et al. | 375/20 |
| 4,577,332 | 3/1986 | Brenig | 375/17 |
| 4,928,288 | 5/1990 | D'Aria et al. | 375/17 |

FOREIGN PATENT DOCUMENTS

| | | |
|---|---|---|
| 54-131811 | 10/1979 | Japan. |
| 3-65886 | 3/1991 | Japan. |
| 3-162138 | 7/1991 | Japan. |
| 5-130084 | 5/1993 | Japan. |
| 6-261306 | 9/1994 | Japan. |
| 6-334572 | 12/1994 | Japan. |
| 7-30524 | 1/1995 | Japan. |
| 7-24786 | 9/1995 | Japan. |
| 8-167887 | 6/1996 | Japan. |
| 10-13318 | 1/1998 | Japan. |

*Primary Examiner*—Stephen Chin
*Assistant Examiner*—Mohammad Ghayour
*Attorney, Agent, or Firm*—Scully, Scott, Murphy & Presser

[57] ABSTRACT

Digital amplitude values of multilevel signals of repeated transmissions are stored in respective locations of a memory which respectively correspond to the transmissions, and a set of amplitude values are simultaneously read from the memory locations and compared with decision threshold bands which respectively represent data symbols. A decision is made in favor of the data symbol of a decision threshold band if majority of the set of amplitude values are lying within the decision threshold band, or in favor of the data symbol of a decision threshold band if only one of the set of amplitude values is lying within or nearest to the decision threshold band and other amplitude values of the set are not nearer to any of the decision threshold bands than the only one amplitude value is near to the decision threshold band.

18 Claims, 3 Drawing Sheets

METHOD OF DIVERSITY-RECEIVING REPEATED TRANSMISSIONS USING SYMBOL DECISION THRESHOLD BANDS

BACKGROUND OF THE INVENTION

1. Field of the Invention

The present invention relates generally to receivers for receiving repeated transmissions of a multilevel signal, and more specifically to a method of making a symbol decision on the received multilevel signal.

2. Description of the Related Art

In conventional radio paging systems, a paging signal is repeatedly transmitted to increase the probability of successful reception. At paging receivers, signals of repeated transmissions are compared with each other on a symbol-by-symbol basis, and the compared symbols are time-diversity combined. In a known diversity method, a sum of symbol values is taken and the sum is divided by the number of symbols to produce an average value. The average value is used as a threshold for making a symbol decision. Another approach involves measuring the distance from each symbol to a reference value and a symbol nearest to the reference is adopted as a representative of the symbols.

However, the averaging method is not suitable for noisy channels because of the susceptibility of its decision thresholds to impulse noise. In the case of the nearest distance approach, a random occurrence of a false optimal (nearest) symbol invalidates many of true sub-optimal symbols. This is particularly disadvantageous when multilevel signals are transmitted.

SUMMARY OF THE INVENTION

It is therefore an object of the present invention to provide a method of receiving repeated transmissions of multilevel signals that is tolerant of impulse noise or false symbols.

According to a broader aspect of the present invention, amplitude values of multilevel signals of repeated transmissions are stored in locations of a memory which respectively correspond to the transmissions, and a set of amplitude values are simultaneously read from the locations of the memory and compared with a plurality of decision threshold bands which respectively represent data symbols. A decision is made in favor of the data symbol of a decision threshold band if majority a of the set of amplitude values lie within the decision threshold band, or in favor of the data symbol of a decision threshold band if only one of the set of amplitude values is lying within or nearest to the decision threshold band and other amplitude values of the set are not nearer to any of the decision threshold bands than said only one amplitude value is near to the decision threshold band.

Since the symbol decision is made by comparison of a plurality of amplitude levels with a plurality of threshold "bands" on a majority basis, the present invention prevents impulse noise and false symbols from affecting the decision process.

According to a second, specific aspect, the present invention provides a method of receiving a repeated transmissions of a multilevel signal, comprising the steps of (a) converting amplitude values of the multilevel signal of a transmission to respective data symbols and storing the amplitude values of the transmission in a memory, (b) repeating the step (a) if the data symbols of the transmission contain uncorrectable errors, so that the amplitude values of a plurality of transmissions are stored in locations of the memory, the locations respectively corresponding to the transmissions. A set of amplitude values are read from the locations of the memory if the data symbols of all of the transmissions contain uncorrectable errors and compared with a plurality of mutually separated decision threshold bands respectively representing the data symbols. A decision is made in favor of the data symbol of a decision threshold band if majority of the set of amplitude values are lying within the decision threshold band, or in favor of the data symbol of a decision threshold band if only one of the set of amplitude values is lying within or nearest to the decision threshold band and other amplitude values of the set are not nearer to any of the decision threshold bands than said only one amplitude value is near to the decision threshold band.

According to a third, specific aspect, the present invention provides a method of receiving repeated transmissions of a multilevel signal, comprising the steps of converting amplitude values of the multilevel signal of a first transmission to respective data symbols, and storing the amplitude values of the first transmission in a memory. If the data symbols of the first transmission contain uncorrectable errors, amplitude values of the first transmission from the memory are read from the memory and amplitude values of the multilevel signal of a subsequent transmission are received. A pair of each read amplitude value and each received amplitude value are compared with a plurality of mutually separated decision threshold bands respectively representing the data symbols. A decision is made in favor of the data symbol of a decision threshold band if the pair of amplitude values are lying within the decision threshold band, or in favor of the data symbol of a decision threshold band if only one of the pair of amplitude values is lying within or nearest to the decision threshold band and the other amplitude value of the pair is not nearer to any of the decision threshold bands than said only one amplitude value is near to the decision threshold band. If the data symbols of the subsequent transmission contain uncorrectable errors, the reading, receiving and decision making steps are repeated.

BRIEF DESCRIPTION OF THE DRAWINGS

The present invention will be described in further detail with reference to the accompanying drawings, in which.

DETAILED DESCRIPTION

Figure 1:
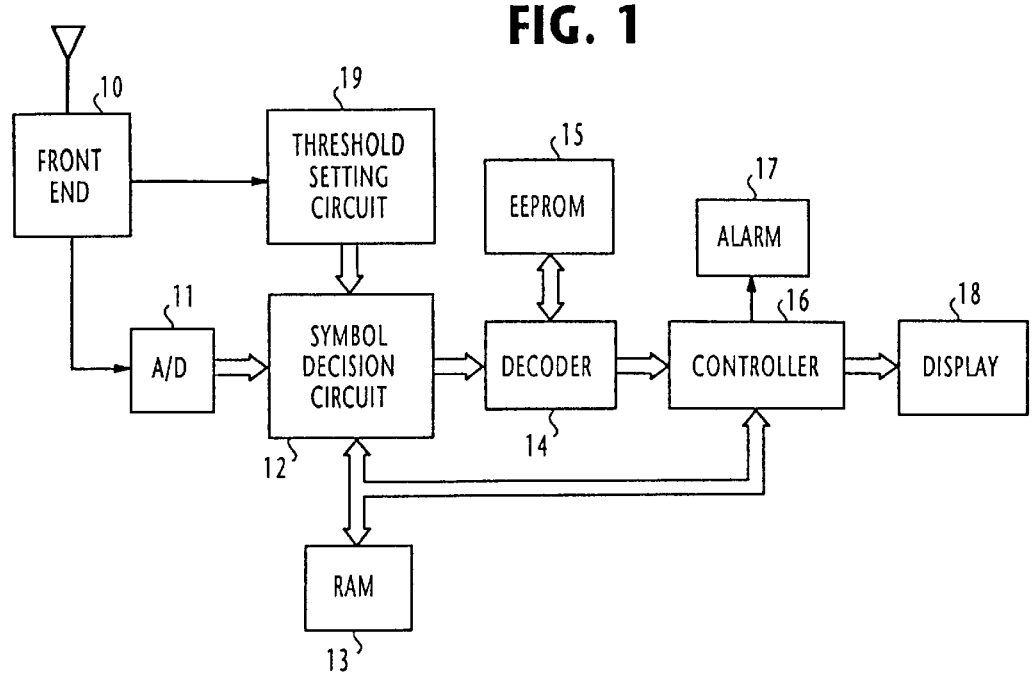
FIG. 1 is a block diagram of a selective calling radio paging receiver incorporating the symbol decision circuit of the present invention.

As shown in FIG. 1, a time-diversity, selective calling radio display pager according to the present invention comprises a radio-frequency section, or front end 10. To increase the probability of successful reception, the same paging signal is transmitted repeatedly in a series of transmissions, called "batches". In each of these batches, a synchronization signal, addresses and messages are transmitted in frames so that a pager needs to search only one frame during each batch for its address and performs time-diversity combining on the repeated transmissions if it fails to receive a transmission. At the transmitter, the original baseband signal is encoded with a two-bit BCH (Bose-Chandhuri-Hocquenghem) line code and transmitted as a series of four-level amplitude values. Front end 10 down-converts the received paging signal to the four-level baseband signal. The baseband signal is applied to an analog-to-digital converter 11 where it is sampled and resolved into "256" discrete levels, for example, and converted to a series of 8-bit digital amplitude values.

A symbol decision circuit 12 is connected to the output of the A/D converter 11 to convert the 8-bit digital amplitude values to the original two-bit symbols in a manner as will be described later.

An address checking circuit, or decoder 14 is provided to decode the line code of the output of the symbol decision circuit 12 into the original digital signal for comparison between transmitted addresses and a pager's address stored in an EEPROM (electrically erasable programmable read-only memory) 15. When there is a match, a message corresponding to the matched address is supplied from the decoder 14 to a controller 16, which responds thereto by activating an alarm 17 to alert the user of the arrival of a call and storing the received signal into a random-access memory 13 for later retrieval. When the user operates a switch, not shown, the stored message is put on display on a display panel 18. The pager further includes a threshold setting circuit 19. This circuit is connected to the symbol decision circuit 12 to establish the width of decision threshold bands within the symbol decision circuit 12 for making symbol decisions.

Figure 2:
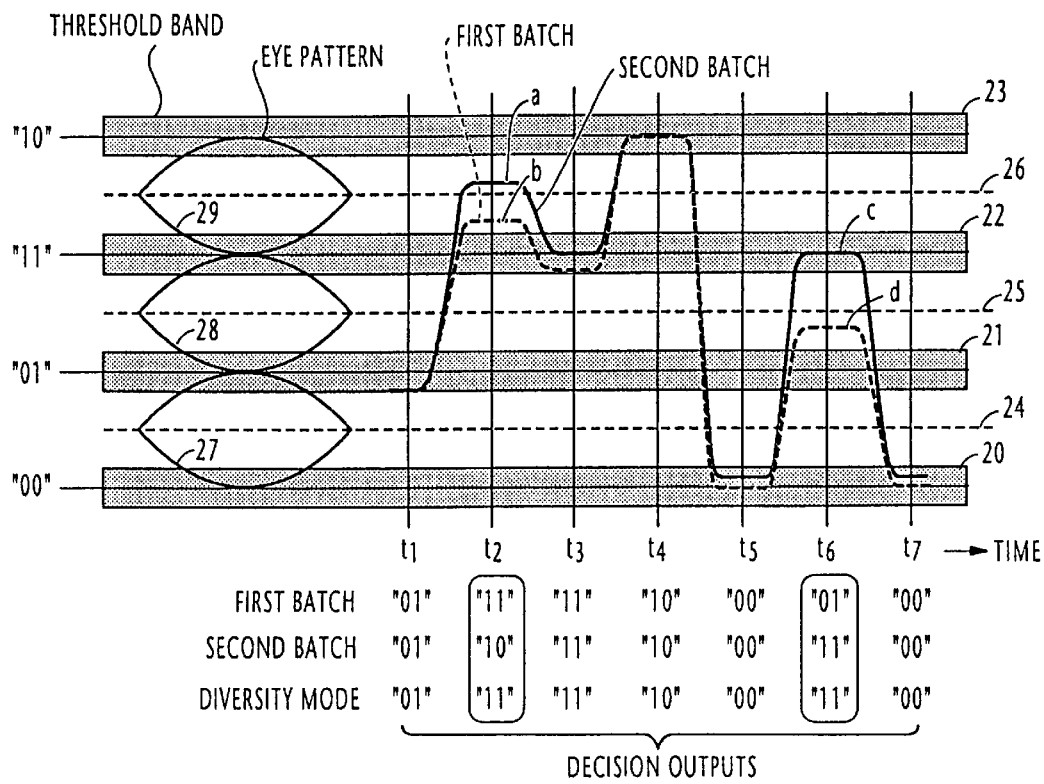
FIG. 2 is a diagram illustrating decision threshold bands used for making symbol decisions according to the present invention.

As illustrated in FIG. 2, mutually separated decision threshold bands 20 to 23 are established in the symbol decision circuit 12. The decision threshold bands 20 to 23 represent two-bit data symbols "10", "11", "01" and "00", respectively. Each decision threshold band has an upper reference amplitude and a lower reference amplitude above and below an intermediate amplitude that represents the corresponding two-bit word. Between adjacent decision threshold bands are defined decision thresholds indicated by dotted lines 24, 25 and 26, each of which is aligned with the vertical midpoint of a corresponding one of eye patterns 27, 28 and 29. As a typical example, digital amplitudes of first and second batches are indicated by dotted and solid thick lines, respectively, in FIG. 2.

The symbol decision of the present invention proceeds as follows. If the digital amplitude value lies within any of the decision threshold bands, the decision circuit 12 produces a data symbol corresponding to that decision threshold band. If the amplitude lies between two decision threshold bands, the A/D converter determines to which of the decision threshold bands the amplitude is nearest. This is achieved by determining on which side of the decision thresholds 24, 25, 26 the amplitude exists. For example, if a digital amplitude value "a" of the second batch lies at time $t_2$ between decision threshold bands 22 and 23, it is determined to be on the upper side of intermediate decision threshold 26 and is therefore determined to be nearest to decision threshold band 23, and hence converted to a data symbol "10".

Therefore, the digital amplitude values of the first batch will be translated into a sequence of two-bit data symbols "01", "11", "11", "10", "00", "01" and "00". If there is no bit error in these data symbols, they are supplied to decoder 14. If errors exist which are correctable, they are supplied to the decoder 14 after error correction. If the errors of the first batch are not correctable, a second batch is received. The second batch will then be translated into a sequence of "01", "10", "11", "10", "00", "11" and "00". As will be described hereinbelow, when time diversity combining is performed, the digital amplitude values of at least two batches are used to produce a sequence of "01", "11", "11", "10", "00", "11" and "00".

The width of each decision threshold band can be appropriately adjusted by the threshold setting circuit 19 depending on the field strength of signals at the pager. If the field strength is low, decision threshold bands of greater width are established to increase the probability of successful reception. However, the decision threshold bands of greater width are not necessarily appropriate for high strength fields since they decrease the reliability of symbol decision since the width of the threshold bands is a measure of reliability. Therefore, if the field strength is high, decision threshold bands of narrower width are established. For these reasons, the threshold setting circuit 19 is preferably connected to the front end 10 for automatically setting the width of each decision threshold band according to the field intensity of the pager.

Figure 3:
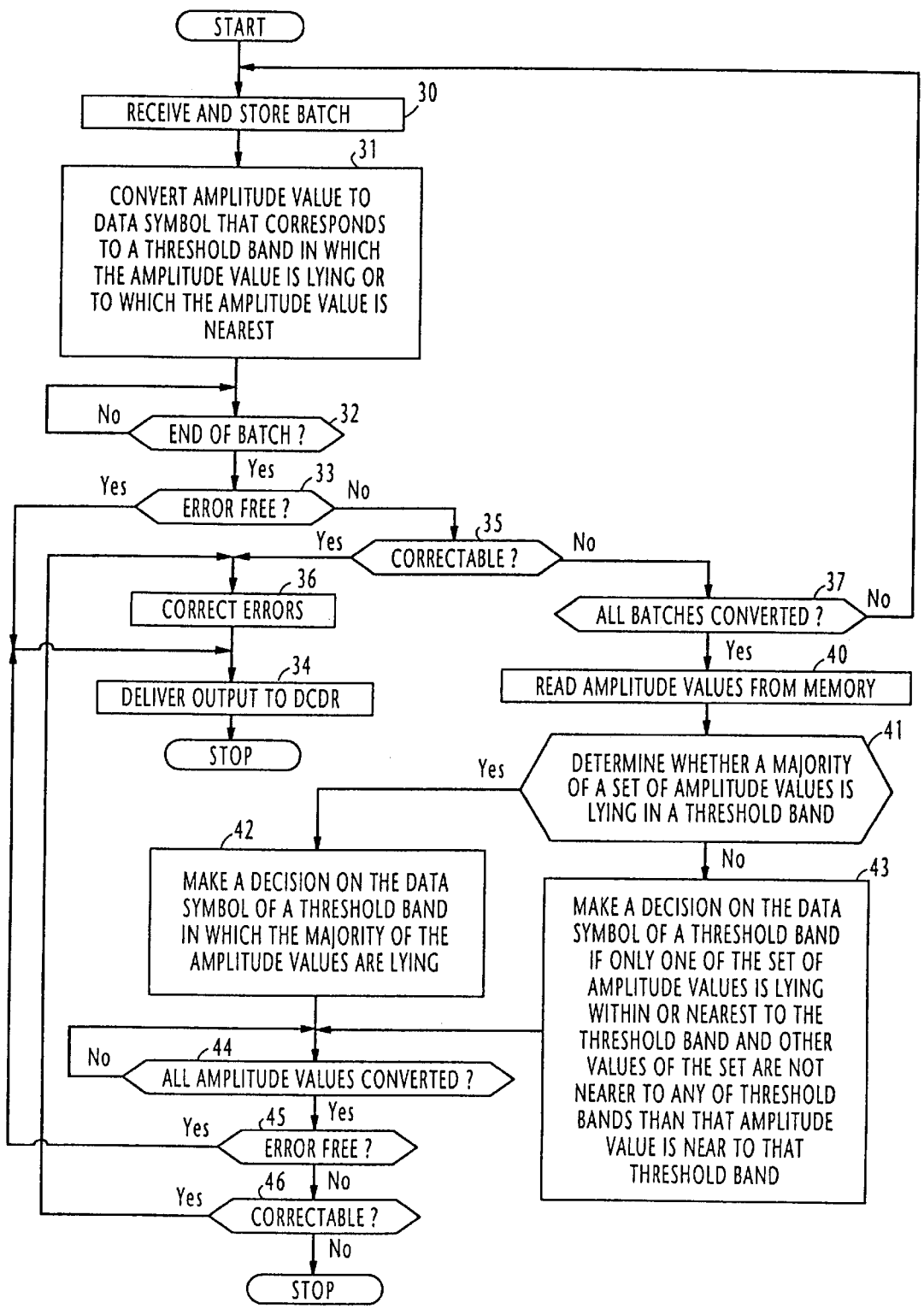
FIG. 3 is a flowchart of the operation of the symbol decision circuit according to a first embodiment of the present invention.

In a first embodiment of the present invention, the symbol decision circuit 12 operates according to the flowchart of FIG. 3, using the memory 13 as storage locations of received signals. The decision circuit 12 initially receives digital amplitude values of a first transmission (batch) from the A/D converter 11 and stores them into a specified location of the memory 13 (step 30). Concurrently, the decision circuit 12 determines whether each amplitude value lies within or nearest to any one of decision threshold bands 20, 21, 22 and 23 (step 31), and makes a decision on the data symbol of a decision threshold band in which the amplitude value is lying or to which it is nearest.

At the end of the received batch (step 32), flow proceeds to step 33 to perform an error check on the determined data symbols and determines whether bit errors exist. If no errors exist, the decision circuit recognizes that the reception of a paging signal is successful and flow proceeds to step 34 to deliver the data symbols to decoder 14, and terminates the routine.

If bit errors are found to exist (step 33), flow proceeds to step 35 to determine if the errors are correctable. If so, flow proceeds to step 36 to correct the errors and proceeds to step 34 to supply the error-corrected symbols to the decoder 14. If the errors are determined to be not correctable, flow branches at step 35 to step 37 to check to see if the above decision process has been performed on all batches. If the decision is negative at step 37, flow returns to step 30 to repeat the above process on the next batch, so that digital amplitude values of a plurality of batches (transmissions) are stored in respective (batch-associated) locations of the memory 13.

If none of the transmitted batches has been correctly received, the decision at step 37 is affirmative and the decision circuit proceeds to step 40 to successively read a set of corresponding amplitude values of all stored batches simultaneously from the respective locations of memory 13 and proceeds to step 41 to determine whether a majority of the set of amplitude values are lying within a decision threshold band.

If the decision at step 41 is affirmative, flow proceeds to step 42 to make a decision in favor of the data symbol of a decision threshold band in which the majority of the amplitude values of the set are lying. Otherwise, flow proceeds from step 41 to step 43 to make a decision in favor of the data symbol of a particular decision threshold band if only one of the amplitude values of the set is lying within or nearest to that decision threshold band, while other amplitude values of the set are not nearer to any of the decision threshold bands than that amplitude value is near to the particular decision threshold band.

Returning to FIG. 2, it is seen that, at time $t_2$, the decision circuit determines that the amplitude value "b" of the first batch is more nearer to decision threshold band 22 than the amplitude "a" of the second batch is to decision threshold band 23, at step 43, and selects it as one that is nearest to the decision threshold band 22 and converts it to a data symbol "11", discarding the amplitude value "a". Likewise, at time $t_6$, the decision circuit selects the amplitude value "c" of the second batch since it is within the decision threshold band 22 and converts it to a data symbol "11", discarding the amplitude value "d".

Following steps 42 and 43, step 44 is executed by checking whether all stored amplitude values are converted to data symbols. If so, flow proceeds to step 45 to perform an error check on the data symbols. If the error check reveals no error, flow advances to step 34 to deliver the output of the decision circuit 12 to decoder 14. If there are errors, flow proceeds from step 45 to step 46 to check for the correctability of the errors. If correctable, flow proceeds from step 46 to the error-correction step 38. If the errors are uncorrectable, the decision circuit recognizes that reception has failed and flow proceeds to the end of the routine.

It is seen that, since the symbol decision is made by comparison of a plurality of amplitude levels with a plurality of threshold "bands" on a majority basis, the present invention prevents impulse noise and false symbols from affecting the decision process.

Figure 4:
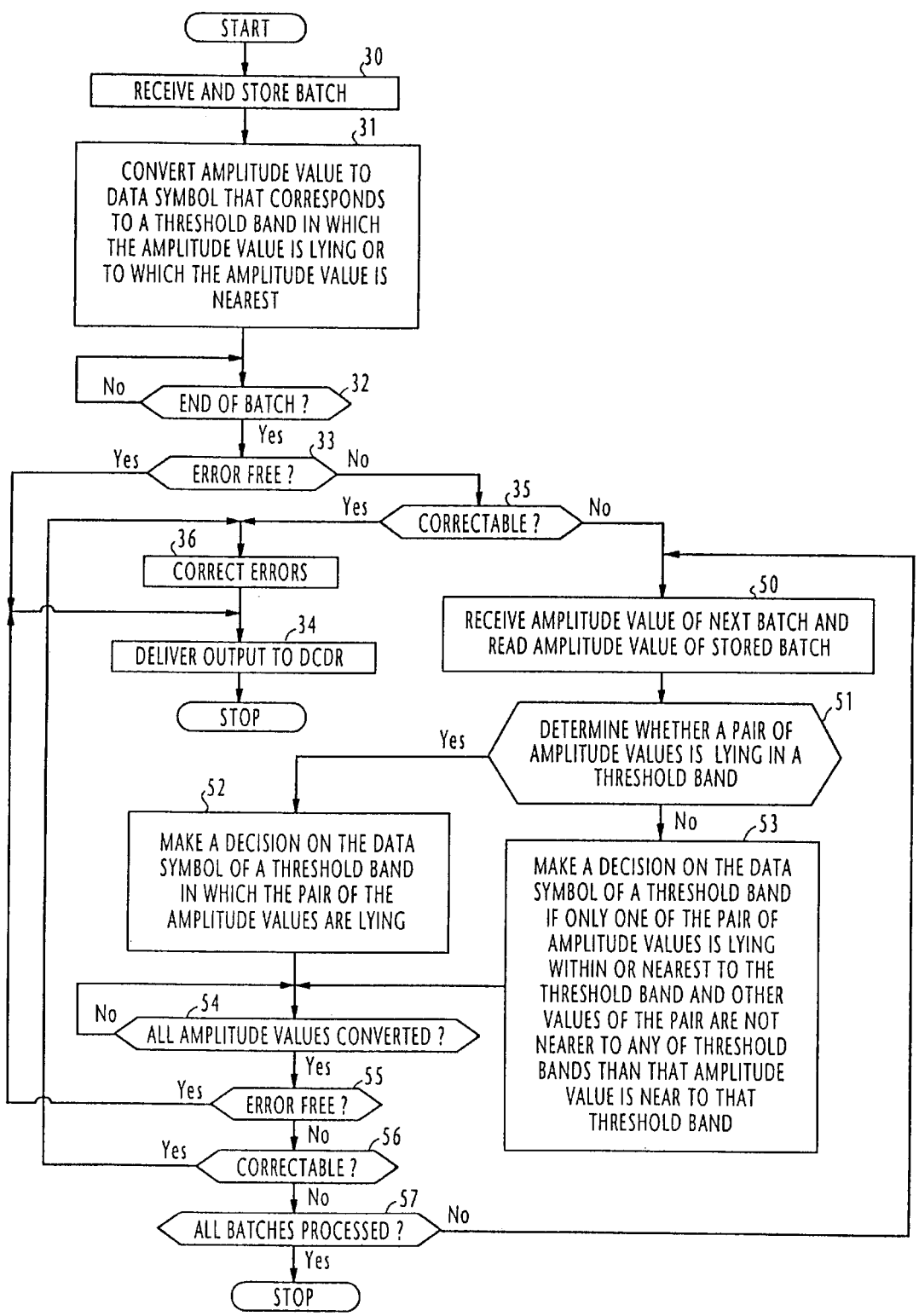
FIG. 4 is a flowchart of the operation of the symbol decision circuit according to a second embodiment of the present invention.

The flowchart shown in FIG. 4 is suitable for applications where the requirement of small memory is important. In FIG. 4, blocks corresponding in significance to those in FIG. 3 are marked with the same numerals as those used in FIG. 3, the description thereof being omitted for simplicity.

Assume that a decision process has been performed by executing steps 30 to 33 on a first batch and uncorrectable errors have been found to exist in the decided data symbols. Then, the decision at step 35 is negative and flow proceeds to step 50 to successively receive an amplitude value of the next batch from A/D converter 11 and successively read a corresponding amplitude value of the first batch from memory 13. Flow proceeds to step 51 to determine whether a pair of each read amplitude value and each received amplitude value fall within a decision threshold band. If the decision at step 51 is affirmative, flow proceeds to step 52 to make a decision in favor of the data symbol of a decision threshold band in which the pair of such amplitude values fall. Otherwise, flow proceeds from step 51 to step 53 to make a decision in favor of the data symbol of a particular decision threshold band if only one of the amplitude values of the pair is lying within or nearest to the decision threshold band while the other amplitude value of the pair is not nearer to any of the decision threshold bands than that amplitude value is near to the particular decision threshold band.

After the execution of steps 52 and 53, flow proceeds to step 54 to check to see if decisions have been made on all amplitude values. If so, flow proceeds to step 55 to perform an error check on the data symbols. If the error check reveals no error, flow branches at step 55 to step 34 to deliver the output of the decision circuit 12 to decoder 14. If there are errors, flow proceeds from step 55 to step 56 to check for their correctability. If correctable, flow proceeds from step 56 to the error-correction step 36. If the errors are uncorrectable, flow proceeds to step 57 to check to see if all batches are processed. If not, flow returns to step 50 to repeat the diversity-mode decision process between the next batch and the stored first batch. When all batches have been processed and uncorrectable errors are still detected, the decision circuit recognizes that reception has failed and flow proceeds from step 57 to the end of the routine. It is seen therefore that the stored first batch is consistently used for making a diversity-mode decision with each subsequent batch. This embodiment requires a memory that is sufficient to store a single batch.

While mention has been made of a radio paging receiver, the symbol decision circuit of this invention could equally be as well used in any receiver that is designed for repeat transmissions of the same information.

What is claimed is:

1. A method of receiving repeated transmissions of a same multilevel signal, comprising the steps of:
   a) storing amplitude values of said multilevel signal of a plurality of repeated transmissions in locations of a memory respectively corresponding to the transmissions;
   b) reading a set of amplitude values simultaneously from said locations of the memory and comparing the set of amplitude values with a plurality of mutually separated decision threshold bands respectively representing data symbols; and
   c) making a decision in favor of the data symbol of a decision threshold band if a majority of the set of amplitude values lie within the decision threshold band, or in favor of the data symbol of a decision threshold band if only one amplitude value of the set of amplitude values lies within or nearest to the decision threshold band and other amplitude values of the set are not nearer to any of said plurality of mutually separated decision threshold bands than said only one amplitude value is near to the decision threshold band.

2. The method of claim 1, wherein the width of each of said plurality of mutually separated decision threshold bands is adjustable.

3. The method of claim 2, wherein said width is adjustable according to field strength of said repeated transmissions.

4. A method of receiving repeated transmissions of a same multilevel signal, comprising the steps of:
   a) converting amplitude values of the multilevel signal of a transmission to respective data symbols and storing said amplitude values of said transmission in a memory;
   b) repeating the step (a) if the data symbols of said transmission contain uncorrectable errors, so that the amplitude values of a plurality of repeated transmissions are stored in locations of said memory, said locations respectively corresponding to the transmissions;
   c) reading a set of amplitude values from said locations of the memory if the data symbols of all of said transmissions contain uncorrectable errors and comparing the set of amplitude values with a plurality of mutually separated decision threshold bands respectively representing said data symbols; and
   d) making a decision in favor of the data symbol of a decision threshold band if a majority of the set of amplitude values lie within the decision threshold band, or in favor of the data symbol of a decision threshold band if only one amplitude value of the set of amplitude values lies within or nearest to the decision threshold band and other amplitude values of the set are not nearer to any of said plurality of mutually separated decision threshold bands than said one amplitude value is near to the decision threshold band.

5. The method of claim 4, wherein the width of each of said plurality of mutually separated decision threshold bands is adjustable.

6. The method of claim 5, wherein said width is adjustable according to field strength of said repeated transmissions.

7. A method of receiving repeated transmissions of a same multilevel signal, comprising the steps of:
   a) converting amplitude values of the multilevel signal of a first transmission to respective data symbols, and storing said amplitude values of said first transmission in a memory;
   b) if the data symbols of said first transmission contain uncorrectable errors, reading amplitude values of said first transmission from said memory and receiving amplitude values of the multilevel signal of a subsequent transmission;
   c) comparing a pair of each read amplitude value and each received amplitude value with a plurality of mutually separated decision threshold bands respectively representing said data symbols;
   d) making a decision in favor of the data symbol of a decision threshold band if the pair of amplitude values lie within the decision threshold band, or in favor of the data symbol of a decision threshold band if only one amplitude value of the pair of amplitude values lies within or nearest to the decision threshold band and the other amplitude value of the pair is not nearest to any of said plurality of mutually separated decision threshold bands than said only one amplitude value is near to the decision threshold band; and
   e) repeating the steps (b) to (d) if the data symbols of said subsequent transmission contain uncorrectable errors.

8. The method of claim 7, wherein the width of each of said plurality of mutually separated decision threshold bands is adjustable.

9. The method of claim 8, wherein said width is adjustable according to field strength of said repeated transmissions.

10. A receiver for receiving repeated transmissions of a same multilevel signal, comprising:
    a memory; and
    a symbol decision circuit for performing the functions of:
    a) storing amplitude values of said multilevel signal of a plurality of repeated transmissions in locations of said memory, said locations respectively corresponding to the transmissions;
    b) reading a set of amplitude values simultaneously from said locations of the memory and comparing the set of amplitude values with a plurality of mutually separated decision threshold bands respectively representing data symbols; and
    c) making a decision in favor of the data symbol of a decision threshold band if a majority of the set of amplitude values lie within the decision threshold band, or in favor of the data symbol of a decision threshold band if only one amplitude value of the set of amplitude values lies within or nearest to the decision threshold band and other amplitude values of the set are not nearer to any of said plurality of mutually separated decision threshold bands than said one amplitude value is near to the decision threshold band.

11. A receiver as claimed in claim 10, further comprising means for adjusting the width of each of said plurality of mutually separated decision threshold bands.

12. A receiver as claimed in claim 11, wherein said width is adjustable according to field strength of said repeated transmissions.

13. A radio paging receiver for receiving repeated transmissions of a multilevel signal, comprising:
    a memory;
    an address checking circuit; and
    a symbol decision circuit for performing the functions of:
    a) converting amplitude values of the multilevel signal of a transmission to respective data symbols, and storing said amplitude values of said transmission in said memory;
    b) supplying the data symbols to said address checking circuit if said data symbols are error-free and repeating the function (a) if the data symbols of said transmission contain uncorrectable errors, so that the amplitude values of a plurality of repeated transmissions are stored in locations of said memory, said locations respectively corresponding to the transmissions;
    c) reading a set of amplitude values from said locations of the memory if the data symbols of all of said transmissions contain uncorrectable errors and comparing the set of amplitude values with a plurality of mutually separated decision threshold bands respectively representing said data symbols; and
    d) making a decision in favor of the data symbol of a decision threshold band if a majority of the set of amplitude values lie within the decision threshold band, or in favor of the data symbol of a decision threshold band if only one amplitude value of the set of amplitude values lies within or nearest to the decision threshold band and other amplitude values of the set are nearer to any of said plurality of mutually separated decision threshold bands than said one amplitude value is near to the decision threshold band; and
    e) supplying the data symbols decided by the function (d) to said address checking circuit if the data symbols are error-free,
    said address checking circuit determining whether the data symbols supplied from the symbol decision circuit contain an address destined for the radio paging receiver.

14. A radio paging receiver as claimed in claim 13, further comprising means for adjusting the width of each of said plurality of mutually separated decision threshold bands.

15. A radio paging receiver as claimed in claim 14, wherein said width is adjustable according to field strength of said repeated transmissions.

16. A radio paging receiver for receiving repeated transmission of a same multilevel signal, comprising:
    a memory;
    an address checking circuit; and
    a symbol decision circuit for performing the functions of:
    a) converting amplitude values of said multilevel signal of a first transmission to respective data symbols, and storing said amplitude values of said first transmission in a memory;
    b) supplying the data symbols to said address checking circuit if the data symbols are error-free;
    c) if the data symbols of said first transmission contain uncorrectable errors, reading amplitude values from said memory and receiving amplitude values of the multilevel signal of a subsequent transmission;
    d) comparing a pair of each read amplitude value and each received amplitude value with a plurality of mutually separated decision threshold bands respectively representing said data symbols;

e) making a decision in favor of the data symbol of a decision threshold band if the pair of amplitude values lie within the decision threshold band, or in favor of the data symbol of a decision threshold band if only one amplitude value of the pair of amplitude values lies within or nearest to the decision threshold band and the other amplitude value of the pair is not nearer to any of said plurality of mutually separated decision threshold bands than said only one amplitude value is near to the decision threshold band; and f) repeating the function (b) to (e) if the data symbols of said subsequent transmission contain uncorrectable errors, and supplying the data symbols decided by the function (e) to said address checking circuit if the data symbols are error-free, said address checking circuit determining whether the data symbols supplied from the symbol decision circuit contain an address destined for the radio paging receiver.

17. A radio paging receiver as claimed in claim 16, further comprising means for adjusting the width of each of said plurality of mutually separated decision threshold bands.

18. A radio paging receiver as claimed in claim 17, wherein said width is adjustable according to field strength of said repeated transmissions.

* * * * *